3,395,136
SEPARATION OF ATACTIC FROM TACTIC POLYPROPYLENE
Alfred W. Francis, Metuchen, N.J., assignor to Mobil Oil Corporation, a corporation of New York
No Drawing. Filed Mar. 5, 1965, Ser. No. 437,559
6 Claims. (Cl. 260—93.7)

This invention relates to a process of fractionation of polyolefins by selective extraction with special solvent materials. It is especially applicable to the separation of atactic polypropylene from tactic polypropylene, or of lower molecular weight polypropylene from higher molecular weight polypropylene.

The tactic polymers contemplated herein are the solid linear polymers of propylene. The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. Thus, a linear polymer of propylene that is insoluble in boiling n-heptane is considered to be tactic.

The linear tactic polymers may be composed of isotactic or syndiotactic chains, blocks or mixtures of these forms. The terms isotactic and syndiotactic are used in accordance with the suggested definitions tentatively approved by the commission on Macromolecules of the International Union of Pure and Applied Chemistry, as outlined in the Journal of Polymer Science, volume 56, pages 153–161 (1962).

Atactic (non-tactic) polypropylene, on the other hand, is an amorphous material that has random structure or orientation around the main chain site of steric isomerism. Atactic polypropylene is also defined in the aforedefined article in Journal of Polymer Science, supra.

In the well-known processes of polymerizing propylene, the polymer obtained is usually a mixture of tactic and atactic polypropylene. In many cases, it is desirable to separate the atactic from the tactic polymers. Most often, such separation is made by preparing a very dilute solution of the polymers and then adding to the solution a suitable precipitant which is miscible with the solvent used. In an analogous case, according to Kunc and Miller U.S. Patent 2,255,388, polyisobutene is dissolved in benzene and, then, acetone or ethyl alcohol is added gradually to bring about precipitation of a portion of the polymer. Such means of separation of atactic and tactic polymers is only moderately selective and it is usually necessary to refractionate to achieve adequate separation. Further disadvantages of such procedures are that the dilute solutions used (frequently under 1% solids) require large volumes of solvent and precipitant which must be distilled out to recover the dissolved polymer. For economy, the solvent and precipitant should be separated and recovered by fractional distillation, which adds materially to the cost of the operation. Solvents with critical temperatures above 200° C., if heated to or near the upper cloud point as proposed (United States Patent 2,837,504 (1958) with isooctane as a solvent, would be above the melting temperatures of isotactic polymers so as to dissolve considerable quantities of the latter, and would be much less selective.

It is one of the objects of this invention to fractionate polypropylene. It is another object to separate tactic polypropylene from atactic polypropylene in mixtures containing the two. It is a further object to obtain such separation by selective solvation without the need of a precipitant. It is yet another object to fractionate polypropylene using much higher relative concentrations of atactic polypropylene than customary in the prior art. It is a still further object to use solvents which may be rapidly and easily removed from the dissolved polymer, at room temperatures.

These and other objects are attained by using, as the fractionating solvent, a liquefied, normally gaseous hydrocarbon or halogen derivative thereof, having a critical temperature higher than 120° C. up to about 190° C. and having a selective solvency for atactic polypropylene at least about 30° C. below the critical temperature. The solvents contemplated herein are the normally gaseous (i.e. gaseous at room temperature, 70° F.) aliphatic and cycloaliphatic hydrocarbons, saturated or unsaturated or certain halogen derivatives. In preferred embodiment, the solvents embodied for use herein have a critical temperature of about 125° C. to about 180° C.

The atactic polypropylene is not substantially, if at all, soluble in these solvents at all temperatures. It has a range of solubility, which will vary somewhat depending upon the particular polymer and solvent. Above and below the range of solubility the atactic polypropylene does not remain in solution. In carrying out the extraction method of this invention, the optimum temperature for greatest selectivity is at or near the upper temperature of solubility (UCP). In some cases, a solvent having the requisite critical temperature will dissolve both atactic and tactic polypropylene. For example, cis-2-butene dissolves both forms. However, its upper limit of solubility temperature is about 125° C. which is less than 45° C. below its critical temperature (160° C.). Other solvents with somewhat excessive range of solubility, and therefore having some solubility for isotactic polymer, are methyl chloride and Freon 21. In practice of this invention, when the particular solvent used has a difference of less than 45° C. between the upper cloud point and its critical temperature, the selectivity is less for an average molecular weight polymer than it is for a higher molecular weight polymer.

The following specific examples are illustrative of the present invention without limiting the scope thereof.

Example 1

To a mixture of 81 parts by weight of tactic polypropylene and 129 parts of atactic polypropylene (which contained about 15% of tactic polymer) was added 1614 parts of trans-2-butene. The mixture was heated to 112° C. in a closed vessel, (and therefore under pressure), agitated vigorously for approximately one minute, and allowed to settle for one minute. The clear liquid was decanted from the sludge and cooled, depositing a heavy yield of solids which on removal of trans-2-butene gave 106 parts of atactic polymer. The undissolved sludge amounted to 100 parts showing the properties of tactic polypropylene.

Example 2

A sample of 159 parts by weight of atactic polypropylene containing a small amount of tactic polymer was treated with 1049 parts of n-butane (13.2% by weight of polymer). It was practically all dissolved at temperatures between 77° and 105° C., but showed a trace of turbidity and sludge, representing the small amount of insoluble tactic polymer. Decantation removed the sludge and the purified atactic polymer was recovered from the clear filtrate by evaporation of the n-butane.

Example 3

Example 2 was repeated with lower concentrations, 8.3% and 4.8% of the same sample of polymer with the same results. The actual concentration used is not crucial, except as it affects viscosity.

In all examples, equilibrium solubility was almost instantaneous except on dissolving the original charge, which required agitation and moderate superheating above the lower solubility point. Heating for several hours at almost uniform temperature had no visible effect on turbidity or volume of sludge.

In Table I are shown some of the solvents useful for separating atactic from tactic polypropylene or for separating different ranges in molecular weight according to the present invention and actual examples of their use. These solvents are so volatile that they are quickly and easily removed from the dissolved polymers by evaporation of the solvent at room temperatures. In each case, tactic polypropylene is insoluble or only slightly soluble in the gaseous solvent, thus affording ready separation of atactic polypropylene at or near the upper temperature of solubility.

TABLE I

| Liquefied Gas | B.P., °C. | Critical Temp., °C. | Weight percent Solution | Atactic Solution Range, °C. | | Pressure (atmos.) at Upper Temp. |
|---|---|---|---|---|---|---|
| | | | | Lower | Upper | |
| Cyclopropane | −34.4 | 124.4 | 3.3 | 34 | 93 | 32.6 |
| | | | 9.2 | 43 | 93 | |
| | | | 12.2 | 50 | 101 | |
| | | | 25.0 | 61 | 105 | |
| Methyl chloride | −23.7 | 143.1 | 2.16 | 6.4 | 108 | 35.7 |
| 1-butene | −6.26 | 146.4 | 1.0 | 92 | 96 | 17 |
| | | | 6.5 | 92 | 96 | 19 |
| Butadiene-1,3 | −4.41 | 152 | 12.5 | 57 | 106 | 14 |
| n-Butane | −0.5 | 152 | 8.5 | | 108 | 16.8 |
| | | | 13.2 | 77 | 105 | |
| trans-2-butene | +0.88 | 155 | 7 | 68 | 110 | 19 |
| cis-2-butene | +3.7 | 160 | 6.2 | 51 | 128 | 24 |
| Freon 21 | 8.92 | 178.5 | 2.04 | 68 | 148 | 29 |

The optimum temperature for carrying out the polymer fractionation may vary quite widely but with the solvents employed in the present process, upper solubility temperatures of at least about 45° C. below the critical temperature of the solvent are generally preferred. Solutions containing up to about 13% by weight of atactic polymer can be used, although slightly lower concentrations may be sometimes preferred, in order to decrease viscosity and facilitate filtering or decantation.

The pressure of the solvation operation is preferably autogenous, i.e. about the vapor pressure of the solvent at the temperature used for solution. Generally pressures of 200–300 p.s.i. are satisfactory for the process. The pressure must be sufficient to maintain the gaseous hydrocarbon in the liquid phase, but higher pressures may be used if desired, without materially affecting results. The type apparatus required is that generally available for taking care of the relatively moderate temperature and pressure requirements.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process of separating atactic polypropylene from tactic polypropylene which comprises subjecting a mixture of the atactic and tactic polypropylene to intimate contact with a liquefied solvent selected from the group consisting of unsaturated aliphatic hydrocarbons, unsaturated and saturated cycloaliphatic hydrocarbons and halogenated hydrocarbons that are normally gaseous at room temperature and have a critical temperature of higher than about 120° C. and up to about 190° C., and has selective solvency for the atactic polypropylene at least about 30° C. below the critical temperature, whereby the atactic polypropylene is extracted from the undissolved tactic polypropylene, and recovering the atactic polypropylene from its solution by evaporation of the solvent at room temperature.

2. A process, as defined in claim 1, in which the solvent has a critical temperature of from about 125 to about 180° C.

3. The process of claim 1 in which the solvent is trans-2-butene.

4. The process of claim 1 in which the solvent is 1-butene.

5. The process of claim 1 in which the solvent is cyclopropane.

6. The process of claim 1 in which the solvent is methyl chloride.

References Cited

UNITED STATES PATENTS 3,280,090    10/1966    Scoggin _____ 260—94.9

OTHER REFERENCES

Brandrup and Immergut: Polymer Handbook (1966), part IV, pp. 187, 232.

JOSEPH L. SCHOFER, *Primary Examiner.*

L. EDELMAN, *Assistant Examiner.*